(12) United States Patent
Wang et al.

(10) Patent No.: US 11,586,321 B2
(45) Date of Patent: Feb. 21, 2023

(54) ELECTRONIC DEVICE WITH FINGERPRINT SENSING FUNCTION

(71) Applicant: Egis Technology Inc., Hsinchu (TW)

(72) Inventors: Chung-Yi Wang, Hsinchu (TW); Yu-Hsuan Lin, Hsinchu (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/601,434

(22) PCT Filed: Mar. 11, 2020

(86) PCT No.: PCT/CN2020/078688
§ 371 (c)(1),
(2) Date: Oct. 5, 2021

(87) PCT Pub. No.: WO2020/233202
PCT Pub. Date: Nov. 26, 2020

(65) Prior Publication Data
US 2022/0197471 A1   Jun. 23, 2022

Related U.S. Application Data

(60) Provisional application No. 62/851,590, filed on May 22, 2019.

(51) Int. Cl.
*G06F 3/041* (2006.01)
*G06F 3/044* (2006.01)
*G06V 40/13* (2022.01)

(52) U.S. Cl.
CPC ........ *G06F 3/04166* (2019.05); *G06F 3/0446* (2019.05); *G06F 3/04164* (2019.05); *G06V 40/1306* (2022.01); *G06V 40/1318* (2022.01)

(58) Field of Classification Search
None
See application file for complete search history.

(56) References Cited

U.S. PATENT DOCUMENTS

2013/0287274 A1* 10/2013 Shi .................. G06V 40/12
                                                                345/174
2013/0314366 A1* 11/2013 Mo .................. G06F 3/0446
                                                                345/174

(Continued)

FOREIGN PATENT DOCUMENTS

CN          104376299         2/2015
CN          106775109         5/2017

(Continued)

OTHER PUBLICATIONS

"International Search Report (Form PCT/ISA/210) of PCT/CN2020/078688," dated May 7, 2020, with English translation thereof, pp. 1-4.

(Continued)

*Primary Examiner* — Krishna P Neupane
(74) *Attorney, Agent, or Firm* — JCIPRNET

(57) ABSTRACT

An electronic device with fingerprint sensing function including a fingerprint sensing array, multiple fingerprint sensing signal readout lines, multiple touch driving lines, a touch driving circuit, and a read circuit is provided. The fingerprint sensing array includes multiple fingerprint sensing units arranged in array. The fingerprint sensing signal readout lines are respectively coupled to a column of fingerprint sensing units of the fingerprint sensing array. The touch driving lines are respectively interleaved with the fingerprint sensing signal readout lines. The touch driving circuit is coupled to the touch driving lines, and provides multiple touch driving signals to the touch driving lines. The read circuit is coupled to the fingerprint sensing signal readout lines. In response to the touch driving lines outputting the touch driving signals, the read circuit determines a touch position of a touch object based on multiple read signals output by the fingerprint sensing signal readout lines.

9 Claims, 5 Drawing Sheets

(56) References Cited

U.S. PATENT DOCUMENTS

| | | | |
|---|---|---|---|
| 2016/0231854 A1* | 8/2016 | Koo | G06V 40/1306 |
| 2018/0082100 A1* | 3/2018 | Hsieh | G06V 10/147 |
| 2018/0210603 A1 | 7/2018 | Won et al. | |
| 2019/0018540 A1* | 1/2019 | Ko | G06F 3/0446 |
| 2019/0102020 A1 | 4/2019 | Suzuki et al. | |
| 2020/0064954 A1* | 2/2020 | Chen | G06F 3/0446 |
| 2020/0065541 A1* | 2/2020 | Jung | G06V 40/1329 |
| 2020/0175245 A1* | 6/2020 | Ding | G06V 40/1318 |
| 2020/0389612 A1* | 12/2020 | Ling | H04N 5/378 |

FOREIGN PATENT DOCUMENTS

| | | |
|---|---|---|
| CN | 107223227 | 9/2017 |
| CN | 107807757 | 3/2018 |
| CN | 108776556 | 11/2018 |
| CN | 109002218 | 12/2018 |
| CN | 109254683 | 1/2019 |
| CN | 110199249 | 9/2019 |
| JP | 2017505971 | 2/2017 |
| JP | 2017084138 | 5/2017 |
| JP | 2019067157 | 4/2019 |
| TW | 201232359 | 8/2012 |

OTHER PUBLICATIONS

"Office Action of Japan Counterpart Application", dated Dec. 6, 2022, pp. 1-4.

"Office Action of China Counterpart Application", dated Dec. 6, 2022, pp. 1-7.

* cited by examiner

ELECTRONIC DEVICE WITH FINGERPRINT SENSING FUNCTION

CROSS-REFERENCE TO RELATED APPLICATION

This application is a 371 application of the international PCT application serial no. PCT/CN2020/078688, filed on Mar. 11, 2020, which claims the priority benefit of U.S. provisional application No. 62/851,590, filed on May 22, 2019. The entirety of each of the above—mentioned patent applications is hereby incorporated by reference herein and made a part of this specification.

BACKGROUND

Technical Field

The disclosure relates to a fingerprint sensing technology, and in particular to an electronic device with fingerprint sensing function.

Description of Related Art

With the development of touch technology and display technology, touch display devices have been gaining popularity among users. A user may directly operate a touch display device with a finger or a stylus, and the operation method is intuitive and convenient. At present, touch display devices have been widely applied in various types of electronic products, such as smart phones, panel computers, or portable notebook computers. On the other hand, fingerprint recognition technology has gradually been widely applied in various electronic devices or products; for example, capacitive, optical, and ultrasonic fingerprint recognition technologies are currently under continuous development and improvement.

However, as the touch screen of mobile electronic devices becomes larger, the space left for fingerprint sensing elements under a non-display zone becomes restricted. In this case, in order to provide users with a more convenient experience, a solution of under-screen fingerprint recognition that enables the fingerprint sensing elements to be disposed under the touch screen is gaining traction. If an electronic device has the under-screen fingerprint recognition function, users may perform both a touch operation and a fingerprint recognition operation in a touch display zone. Therefore, achieving better touch performance and fingerprint recognition performance by integrating the elements required by the touch function and the fingerprint recognition function without affecting the display effect is an important issue in the field.

SUMMARY

In view of the above, the disclosure provides an electronic device with fingerprint sensing function, which improves the performance of touch detection and reduces the layout area required for disposing touch elements.

An embodiment of the disclosure provides an electronic device including a fingerprint sensing array, multiple fingerprint sensing signal readout lines, multiple touch driving lines, a touch driving circuit, and a read circuit. The fingerprint sensing array includes multiple fingerprint sensing units arranged in array. Each of the fingerprint sensing signal readout lines is coupled to a column of fingerprint sensing units in the fingerprint sensing array. The touch driving lines are respectively disposed to be interleaved with the fingerprint sensing signal readout lines. The touch driving circuit is coupled to the touch driving lines, and provides multiple touch driving signals to the touch driving lines. The read circuit is coupled to the fingerprint sensing signal readout lines. In response to the touch driving lines outputting the touch driving signals, the read circuit determines a touch position of a touch object based on multiple read signals output by the fingerprint sensing signal readout lines.

Based on the above, in the embodiment of the disclosure, multiple touch driving lines are respectively disposed to be interleaved with multiple fingerprint sensing signal readout lines to detect a touch event by sensing a capacitance change between the touch driving lines and the fingerprint sensing signal readout lines. In this way, through the embodiment of the disclosure, the area required for disposing the touch elements may be reduced. In addition, by providing different touch driving signals to the touch driving lines at the same time, touch sensing performance may be improved in the embodiment of the disclosure.

To further describe the features and advantages of the disclosure, embodiments accompanied with drawings are described below in details.

BRIEF DESCRIPTION OF THE DRAWINGS

The drawings are included for further understanding of the disclosure, and the drawings are incorporated into the present specification and constitute a part of the present specification. The drawings illustrate the embodiments of the disclosure, and illustrate the principles of the disclosure together with the descriptions.

DESCRIPTION OF THE EMBODIMENTS

Figure 1:
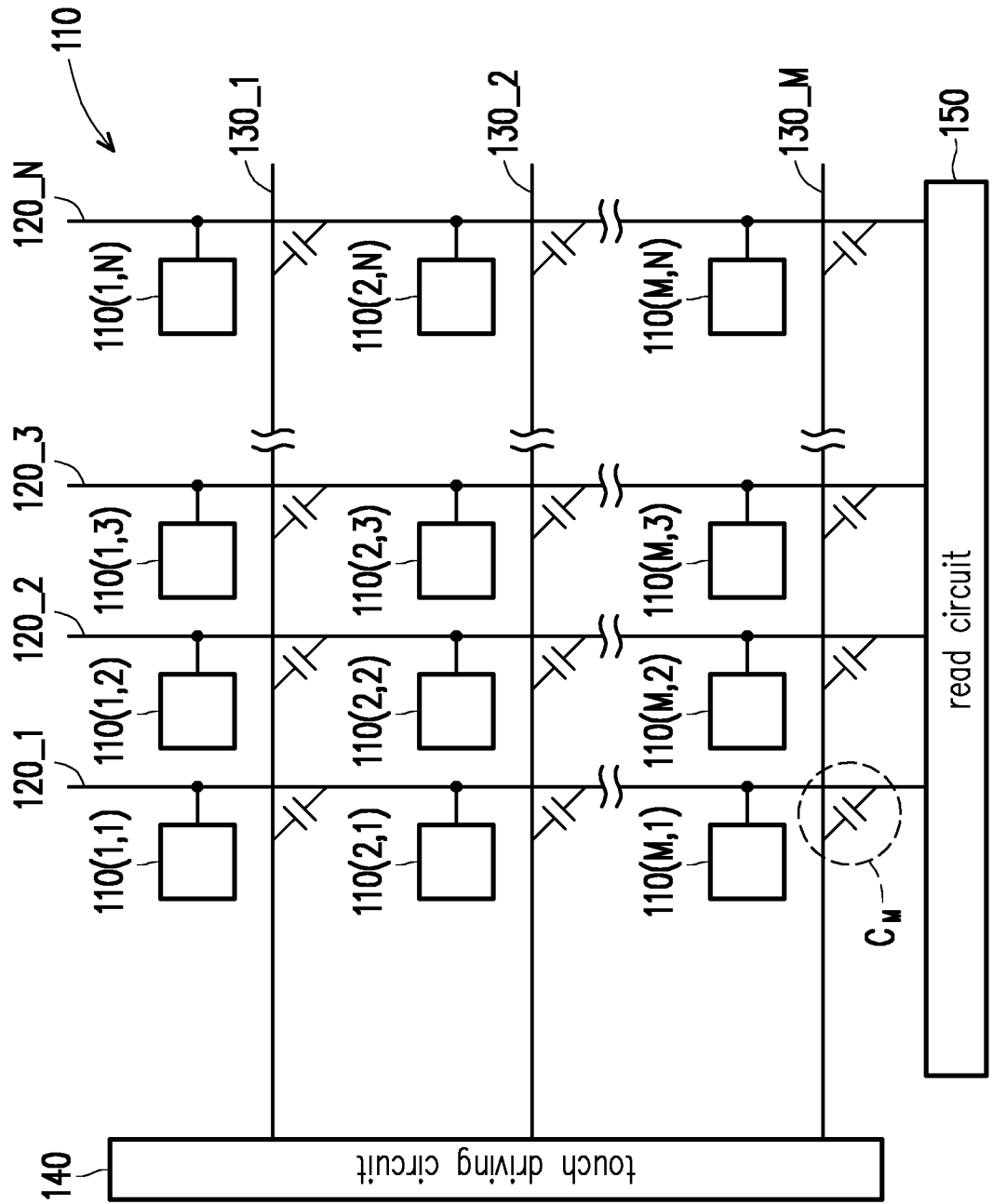
FIG. 1 is a schematic diagram of an electronic device according to an embodiment of the disclosure.

Now, reference will be made in detail to the exemplary embodiments of the disclosure, and examples of the exemplary embodiments are illustrated in the accompanying drawings. Whenever possible, same component symbols are used in the drawings and descriptions to indicate same or similar parts.

It should be understood that when a component such as a layer, film, zone or substrate is referred to be "on" or "connected to" another component, the component may be directly on or connected to said another component, or there may exist an intermediate component. On the contrary, when a component is referred to be "directly on another component" or "directly connected to" another component, there exists no intermediate component. As used herein, "connected" may refer to physical and/or electrical connection. Furthermore, "electrical connection" or "coupling" may indicate that there exist other components between two components.

FIG. 1 is a schematic diagram of an electronic device according to an embodiment of the disclosure. Referring to FIG. 1, an electronic device 10 with fingerprint sensing function may be implemented as a smart phone, a panel, a game console, or other electronic products with under-screen fingerprint recognition function, and the disclosure is not limited thereto. In the embodiments of the disclosure, a display zone of a touch panel is a touchable zone, and a user may touch the display zone on the electronic device 10 with a finger or other touch objects to perform a touch operation. In addition, the user may touch the display zone on the electronic device 10 with a finger to perform a fingerprint recognition operation, too.

The electronic device 10 may include a fingerprint sensing array 110, a plurality of fingerprint sensing signal readout lines 120_1 to 120_N, a plurality of touch driving lines 130_1 to 130_M, a touch driving circuit 140, and a read circuit 150. In addition, the electronic device 10 may further include a display panel (not shown), and the display panel may be implemented as an organic light to emitting diode (OLED) display panel, active matrix organic light emitting diode (AMOLED) display panel, or a liquid crystal display (LCD) display panel, and the disclosure is not limited thereto.

The fingerprint sensing array 110 includes a plurality of fingerprint sensing units 110(1,1), . . . , 110(M,1), . . . , 110(1,N), . . . , 110(M,N) arranged in array, where M and N may be any integer determined according to design requirements. In the embodiments of the disclosure, the electronic device 10 may use optical fingerprint recognition technology or capacitive fingerprint recognition technology. Correspondingly, each of the fingerprint sensing units 110(1,1) to 110(M,N) may include a photosensitive diode or a fingerprint sensing electrode. For example, each of the fingerprint sensing units 110(1,1) to 110(M,N) may include a photosensitive diode for photoelectric conversion, so as to perform fingerprint sensing according to fingerprint light reflected by the finger. In other words, by illuminating the finger with a self-luminous display panel or an additional lighting element, the fingerprint sensing array 110 may sense the reflected light reflected by the finger with fingerprint information to generate a fingerprint image. Alternatively, each of the fingerprint sensing units 110(1,1) to 110(M,N) may include a fingerprint sensing electrode to perform fingerprint sensing according to a capacitance change on the fingerprint sensing electrode. In other words, by charging and discharging the fingerprint sensing electrode, the fingerprint sensing array 110 may sense the capacitance change caused by ridges and valleys of the finger to generate the fingerprint image.

Referring to FIG. 1, the fingerprint sensing signal readout lines 120_1 to 120_N are respectively coupled to a column of fingerprint sensing units of the fingerprint sensing array 10. For example, the fingerprint sensing signal readout line 120_1 is electrically connected to the fingerprint sensing units 110(1,1), 110(2,1), . . . , 110(M,1) in the first column, and the fingerprint sensing signal readout line 120_2 is electrically connected to the fingerprint sensing units 110(1, 2), 110(2,2), . . . , 110(M,2) in the second column, and so on. In addition, the read circuit 150 is coupled to the fingerprint sensing signal readout lines 120_1 to 120_N to receive a read signal output by the fingerprint sensing signal readout lines 120_1 to 120_N. On the other hand, the touch driving lines 130_1 to 130_M are respectively interleaved with the fingerprint sensing signal readout lines 120_1 to 120_N. As shown in FIG. 1, the touch driving line 120_1 and the fingerprint sensing signal readout lines 120_1 to 120_N are respectively interleaved with each other, and the touch driving line 120_2 and the fingerprint sensing signal readout lines 120_1 to 120_N are respectively interleaved with each other, and so on.

In an implementation example of the disclosure, when the electronic device 10 is operating in a fingerprint sensing mode, the fingerprint sensing signal readout lines 120_1 to 120_N output a read signal which may reflect fingerprint information. When the electronic device 10 is operating in a touch sensing mode, the fingerprint sensing signal readout lines 120_1 to 120_N output a read signal which may reflect touch information. Based on the above, the read circuit 150 may be configured to determine a touch position of a touch object while the fingerprint sensing array 110 is disabled from performing a fingerprint sensing operation.

Specifically, the touch driving circuit 140 is coupled to the touch driving lines 130_1 to 130_M. When the electronic device 10 is operated in the touch sensing mode, the touch driving circuit 140 may provide a plurality of touch driving signals to the touch driving lines 130_1 to 130_M. The touch driving signals may be sine waves, sawtooth waves, triangle waves, square waves or any other periodic function. In response to the touch driving lines 130_1 to 130_M outputting the touch driving signals sequentially or at the same time, the read circuit 150 may determine the touch position of the touch object according to the read signals output by the fingerprint sensing signal readout lines 120_1 to 120_N.

In the embodiments of the disclosure, the fingerprint sensing signal readout lines 120_1 to 120_N and the touch driving lines 130_1 to 130_M respectively are metal traces. In this embodiment, there is a preset coupling node capacitance CM at the intersection between the fingerprint sensing signal readout lines 120_1 to 120_N and the touch driving lines 130_1 to 130_M. When the fingerprint sensing array 10 is disabled and there is no finger touch, the coupling node capacitance value CM does not change. However, when a finger touches an upper cover above a mesh pattern formed by the fingerprint sensing signal readout lines 120_1 to 120_N and the touch driving lines 130_1 to 130_M, the coupling node capacitance value between a part of the fingerprint sensing signal readout lines 120_1 to 120_N and a part of the touch driving lines 130_1 to 130_M touched by the finger changes. Based on the mutual capacitance touch sensing principle as described above, the read circuit 150 may determine the touch position of the touch object according to the read signals output by the fingerprint sensing signal readout lines 120_1 to 120_N.

In addition, the electronic device 10 of this embodiment may further include other necessary circuit elements, for example, a digital signal processor (DSP), an analog-to-digital converter (ADC), or an analog front end (AFE), etc., and the disclosure is not limited thereto.

Figure 2A:
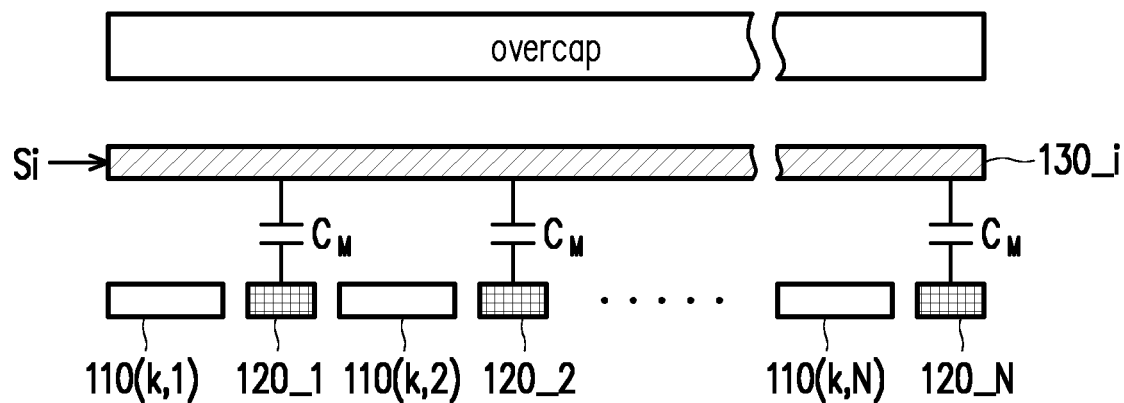
FIGS. 2A and 2B are schematic side diagrams of an electronic device according to an embodiment of the disclosure.
Figure 2B:
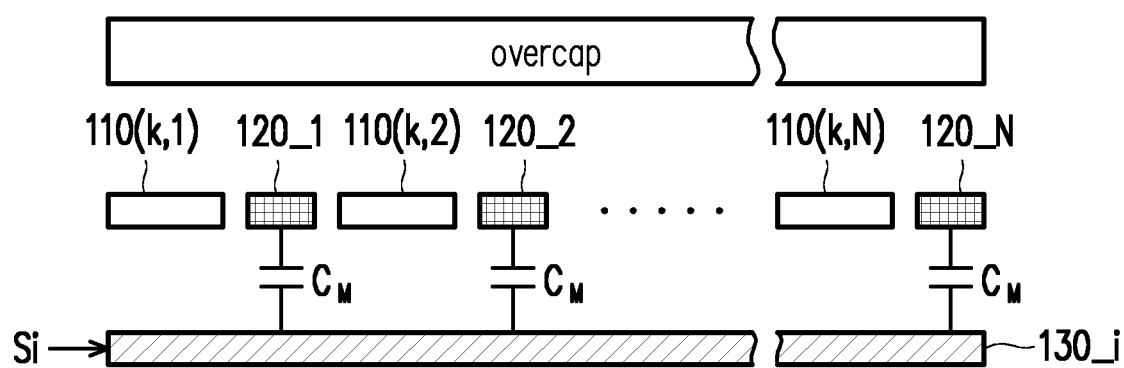

In an embodiment of the disclosure, the touch driving lines 130_1 to 130_M may be disposed in an interleaved manner above or below the fingerprint sensing signal readout lines 120_1 to 120_N, and an insulation layer is disposed between the touch driving lines 130_1 to 130_M and the fingerprint sensing signal readout lines 120_1 to 120 N. FIGS. 2A and 2B are schematic side diagrams of an electronic device according to an embodiment of the disclosure. Referring to FIG. 2A first, FIG. 2A illustrates an example of disposing the touch driving lines 130_1 to 130_M above the fingerprint sensing signal readout lines 120_1 to 120_N. An $i^{th}$ touch driving line 130_i is disposed above the fingerprint sensing signal readout lines 120_1 to 120_N and fingerprint sensing units 110(k,1), 110(k,2), . . . , 110(k,N) (i and k are positive integers less than or equal to M), and the $i^{th}$ touch driving line 130_i is interleaved with the fingerprint sensing signal readout lines 120_1 to 120_N, respectively. In contrast, referring to FIG. 2B, FIG. 2B illustrates an example of disposing the touch driving lines 130_1 to 130_M under the fingerprint sensing signal readout lines 120_1 to 120_N. The $i^{th}$ touch driving line 130_i is disposed under the fingerprint sensing signal readout lines 120_1 to 120_N and the fingerprint sensing units 110(k,1), 110(k,2), ..., 110(k,N) (i and k are positive integers less than or equal to M), and the $i^{th}$ touch driving line 130_i is interleaved with the fingerprint sensing signal readout lines 120_1 to 120_N, respectively. In the examples of FIGS. 2A and 2B, a plurality of intersections between the $i^{th}$ touch driving line 130_i and the fingerprint sensing signal readout lines 120_1 to 120_N has a corresponding coupling node capacitance CM based on a touch driving signal Si on the $i^{th}$ touch driving line 130_i.

It is worth mentioning that in an embodiment of the disclosure, the touch driving circuit 140 may sequentially provide touch driving signals with the same waveform to each of the touch driving lines 130_1 to 130_M at different times. Alternatively, in another embodiment of the disclosure, the touch driving circuit 140 may provide touch driving signals with different waveforms to each of the touch driving lines 130_1 to 130_M at the same time. The following embodiments will illustrate the above.

Figure 3:
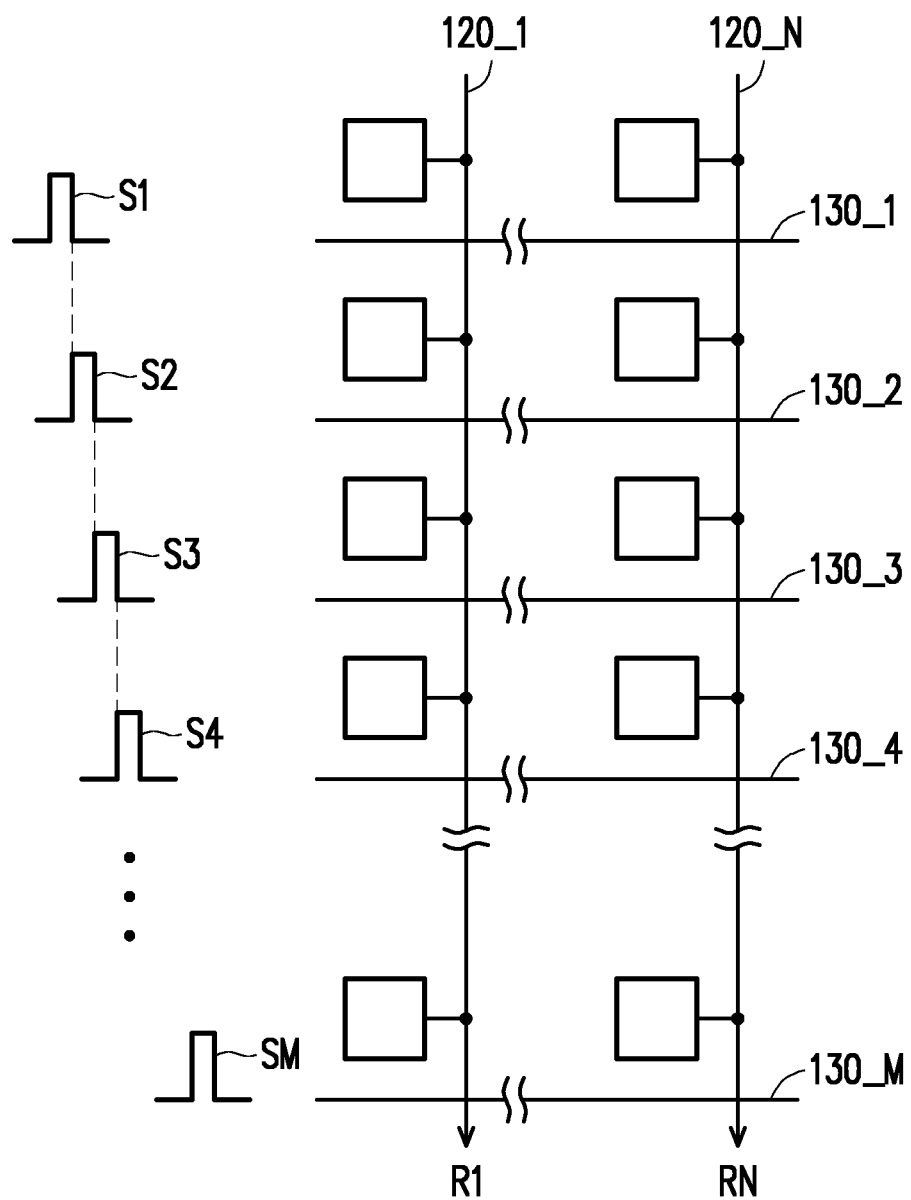
FIG. 3 is a schematic diagram of providing touch driving signals at different times according to an embodiment of the disclosure.

FIG. 3 is a schematic diagram of providing touch driving signals at different times according to an embodiment of the disclosure. Referring to FIG. 3, the touch driving circuit 140 provides M touch driving signals S1 to SM in sequence to the touch driving lines 130_1 to 130_M at different times, and the waveform of each of the touch driving signals 130_1 to 130_M is the same. The touch driving signals S1 to SM are square wave signals with the same waveform, but the touch driving lines 130_1 to 130_M receive the square wave signals in sequence at different time points. In this way, when the touch driving circuit 140 outputs the touch driving signal S1 to the touch driving line 130_1, the read circuit 150 may determine whether there is a touch event occurring at any intersection point between the touch driving line 130_1 and the fingerprint sensing signal readout lines 120_1 to 120_N according to read signals R1 to RN output by the fingerprint sensing signal readout lines 120_1 to 120_N. Next, when the touch driving circuit 140 outputs a touch driving signal S2 to the touch driving line 130_2, the read circuit 150 may determine whether there is a touch event occurring at any intersection point between the touch driving line 130_2 and the fingerprint sensing signal readout lines 120_1 to 120_N according to the read signals R1 to RN output by the fingerprint sensing signal readout lines 120_1 to 120_N, and so on.

Figure 4:
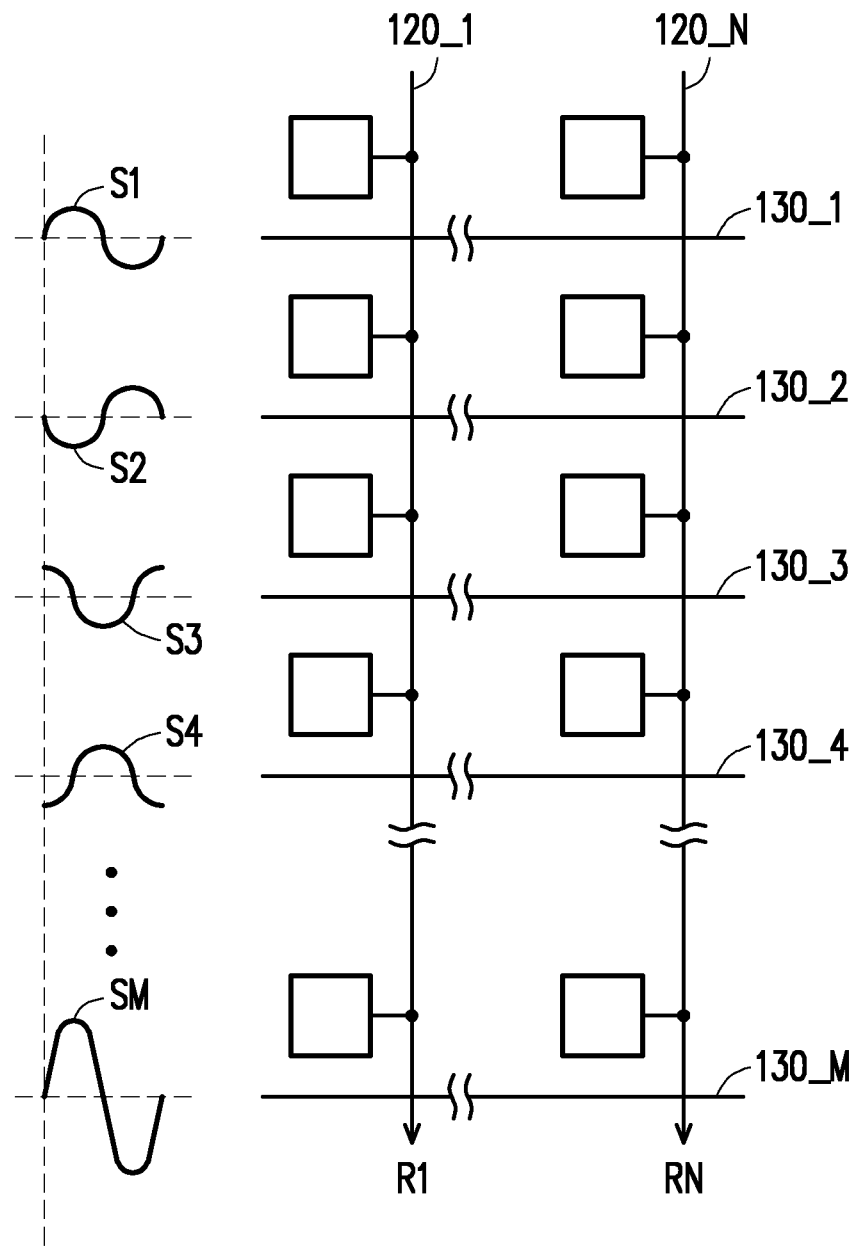
FIG. 4 is a schematic diagram of providing touch driving signals at the same time according to an embodiment of the disclosure.

FIG. 4 is a schematic diagram of providing touch driving signals at the same time according to an embodiment of the disclosure. Referring to FIG. 4, the touch driving circuit 140 provides M touch driving signals S1 to SM to the touch driving lines 130_1 to 130_M at the same time, and the waveform of each of the touch driving signals 130_1 to 130_M is different.

Therefore, an integrator (not shown) in the read circuit 150 may perform an integration operation on the read signals R1 to RN according to the touch driving signals S1 to SM, respectively, to determine the touch position of the touch object according to an integration result of each of the read signals R1 to RN. Accordingly, since the touch driving circuit 140 outputs M touch driving signals S1 to SM to the touch driving lines 130_1 to 130_M at the same time, the integration time of the read circuit 150 may be extended, thereby improving the touch detection performance. It should be noted that, in an embodiment, the waveforms of these touch driving signals S1 to SM may be orthogonal to each other, so that the read circuit 150 may calculate and operate to determine the touch information more easily.

Figure 5:
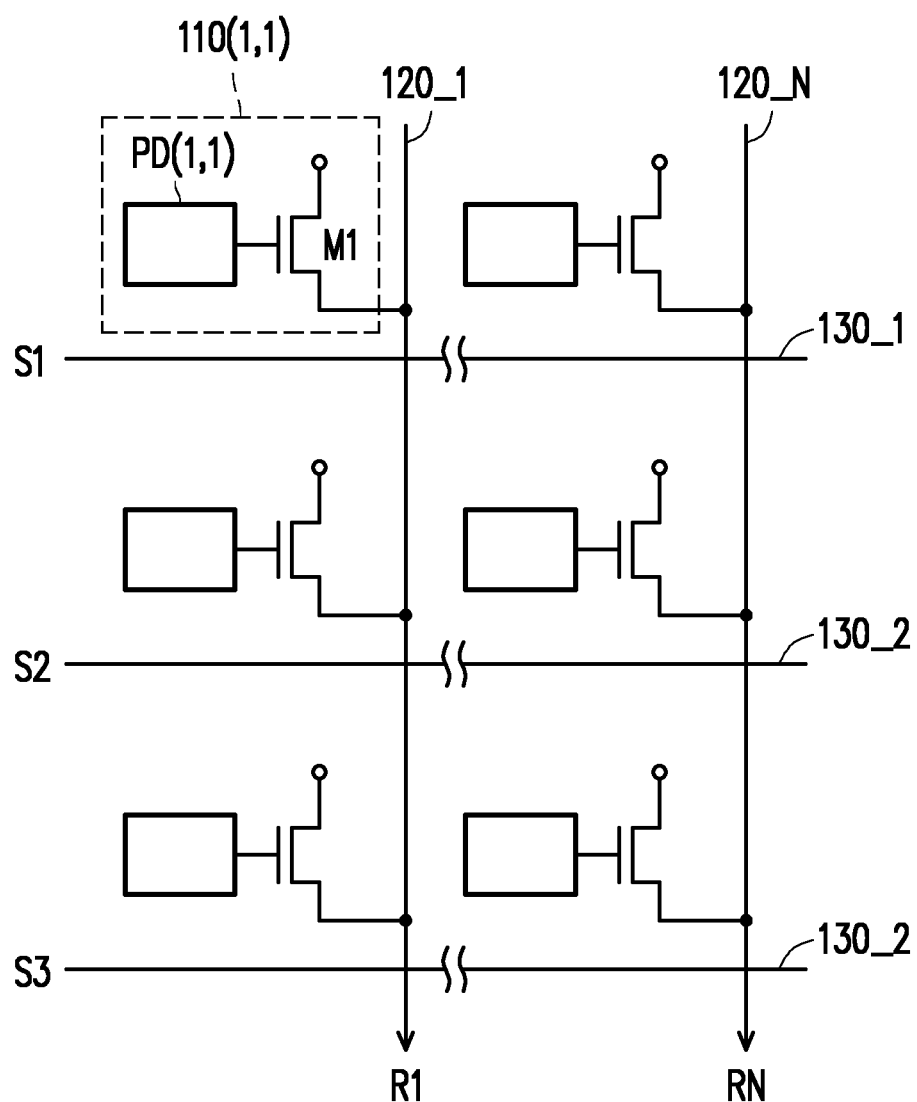
FIG. 5 is a schematic diagram of an electronic device according to an embodiment of the disclosure.

FIG. 5 is a schematic diagram of an electronic device according to an embodiment of the disclosure. Referring to FIG. 5, in this embodiment, it is assumed that each of the fingerprint sensing unit 110(1,1) to 110(M,N) includes a photosensitive diode. Taking the fingerprint sensing unit 110(1,1) as an example for illustration, a photosensitive diode PD(1,1) is coupled to a control end (i.e. a gate) of a transistor M1, and a first end (that is, one of a drain and a source) of the transistor M1 is coupled to the fingerprint sensing signal readout line 120_1 among the fingerprint sensing signal readout lines 120_1 to 120_N. A second end (that is, another one of the drain and the source) of the transistor M1 may be coupled to a reference voltage. In addition, when the electronic device 10 is operating in the touch sensing mode, the driving signals used to drive the fingerprint sensing units 110(1,1) to 110(M,N) have a grounding voltage, so as to disable the fingerprint sensing array 110. On the other hand, when the electronic device 10 is operating in the fingerprint sensing mode, the touch driving circuit 140 may connect the touch driving lines 130_1 to 130_M to the grounding voltage to avoid the signal on the touch driving lines 130_1 to 130_M from interfering with the fingerprint recognition result.

In addition, it should be noted that in the example as described above, the number of touch driving lines used to sense the touch information is the same as the number of rows of the fingerprint sensing units, but the disclosure is not limited thereto. In another embodiment, the touch driving lines include a first touch driving line and a second touch driving line that are adjacent to each other. The first touch driving line and the second touch driving line are at least separated by one row (that is, one or more rows) of fingerprint sensing units. For example, assuming that the fingerprint sensing array includes M rows of fingerprint sensing units, the number of touch driving lines may be M, M/2, M/3, etc., and the number of touch driving lines may be determined according to actual requirements.

In summary, in the embodiments of the disclosure, touch sensing may be performed based on the capacitance change between the fingerprint sensing signal readout lines and the touch sensing lines. Therefore, the need of disposing touch sensing electrodes may be eliminated and the circuit layout area and costs may be reduced as a result. In addition, by outputting different touch driving signals at the same time, the touch position of the touch object may be determined directly based on the read signal output by each fingerprint sensing signal readout line, so there is no need to scan and read row by row, thereby saving touch sensing time.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, comprising:
  a fingerprint sensing array, comprising a plurality of fingerprint sensing units arranged in array;

a plurality of fingerprint sensing signal readout lines, respectively coupled to a part of the fingerprint sensing units in the fingerprint sensing array, wherein each of the fingerprint sensing signal readout lines is coupled to a column of fingerprint sensing units in the fingerprint sensing array;

a plurality of touch driving lines, respectively disposed to be interleaved with the fingerprint sensing signal readout lines, and connected to a grounding voltage in a fingerprint sensing mode;

a touch driving circuit, coupled to the touch driving lines, providing a plurality of touch driving signals to the touch driving lines; and a read circuit, coupled to the fingerprint sensing signal readout lines, wherein, in response to the touch driving lines outputting the touch driving signals while operating in a touch sensing mode, the read circuit determines a touch position of a touch object based on capacitance change between the fingerprint sensing signal readout lines and the touch driving lines according to a plurality of read signals output by the fingerprint sensing signal readout lines while the fingerprint sensing array is disabled from performing a fingerprint sensing operation, in response to operating in the touch sensing mode, driving signals for driving the fingerprint sensing units is configured to have a grounding voltage; and in response to operating in the fingerprint sensing mode, the touch driving circuit is configured to connect the touch driving lines to the grounding voltage.

2. The electronic device according to claim 1, wherein the touch driving circuit sequentially provides the touch driving signals to the touch driving lines at different times, and a waveform of each of the touch driving signals is the same.

3. The electronic device according to claim 1, wherein the touch driving circuit provides the touch driving signals to the touch driving lines at the same time, and a waveform of each of the touch driving signals is different.

4. The electronic device according to claim 3, wherein the waveform of each of the touch driving signals is orthogonal to each other.

5. The electronic device according to claim 4, wherein each of the fingerprint sensing units comprises a photosensitive diode or a fingerprint sensing electrode.

6. The electronic device according to claim 5, wherein the photosensitive diode is coupled to a control end of a transistor, and a first end of the transistor is coupled to one of the fingerprint sensing signal readout lines.

7. The electronic device according to claim 1, wherein the touch driving lines are disposed in an interleaved manner above or below the fingerprint sensing signal readout lines, and an insulation layer is disposed between the touch driving lines and the fingerprint sensing signal readout lines.

8. The electronic device according to claim 7, wherein while the fingerprint sensing array is disabled from performing a fingerprint sensing operation, the read circuit is configured to determine the touch position of the touch object.

9. The electronic device according to claim 1, wherein the touch driving lines comprise a first touch driving line and a second touch driving line adjacent to each other, and the first touch driving line and the second touch driving line are at least separated by one row of fingerprint sensing units.

* * * * *